Albert K. Cummings
INVENTOR.

United States Patent Office 2,918,078
Patented Dec. 22, 1959

2,918,078

VALVE HAVING CLAMPED RESILIENT INSERTS

Albert K. Cummings, Oklahoma City, Okla.

Application December 21, 1956, Serial No. 629,824

5 Claims. (Cl. 137—332)

This invention relates in general to new and useful improvements in valve constructions, and more specifically to an improved valve having resilient inserts.

The primary object of this invention is to provide an improved valve which includes a valve seat and a valve member, at least the valve member being provided with a resilient insert which projects beyond the remainder thereof for engagement with the valve seat, the resilient insert forming a seating surface which will assure a proper seal and at the same time will prevent handling during the continued operation of the valve.

Another object of this invention is to provide an improved valve assembly which includes a valve seat and a valve member, the valve member including a valve member body, a valve member insert being disposed intermediate the valve member body and the valve seat, and being carried relative to the valve member body and the valve member insert a pressure plate, the pressure plate being engageable with the valve seat for clampingly engaging the valve member insert to urge the peripheral portion of the insert outwardly and into sealed engagement with the valve seat.

Another object of this invention is to provide an improved valve assembly which includes a valve seat and a valve member, the valve member being provided with fins engageable with fluid flowing through the valve assembly whereby the valve member is rotated while open to assure new contact surfaces each time the valve member moves to a valve seat engaging position.

Still another object of this invention is to provide an improved valve assembly which includes a valve seat and a valve member, the valve seat including a valve seat body, a resilient insert projecting upwardly from the valve seat body for engagement with the valve member, a pressure ring engaging the valve seat insert and forcing the upper edge thereof above the valve seat body for engagement with the valve member, the pressure ring being engaged by the valve member for clampingly engaging the valve seat insert when the valve member is in a closed position.

A further object of this invention is to provide a valve assembly which includes a valve seat and a valve member, both the valve seat and the valve member being provided with resilient inserts, the inserts being so mounted whereby they engage each other to form the seal between the valve seat and the valve member, both the valve seat and the valve member being provided with pressure members clampingly engaging the resilient inserts and being engaged with opposed parts upon the seating of the valve member to urge the valve inserts outwardly of the valve seat and the valve member and to assure a seal between the valve member and the valve seat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
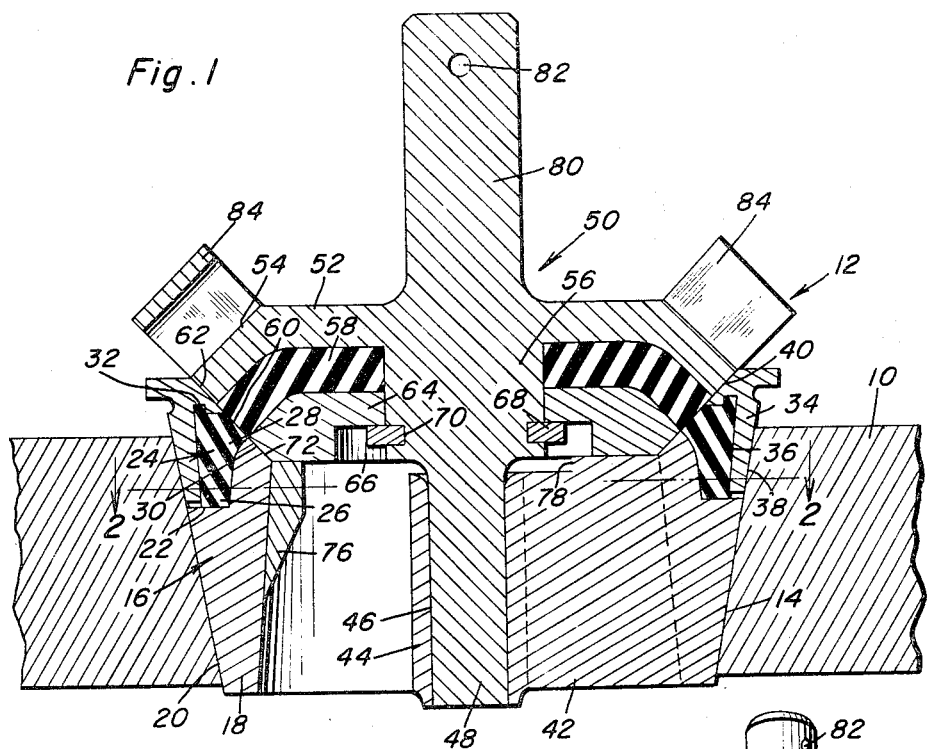
Figure 1 is a vertical sectional view taken through the valve which is the subject of this invention and shows the general details of the various components thereof.
Figure 2:
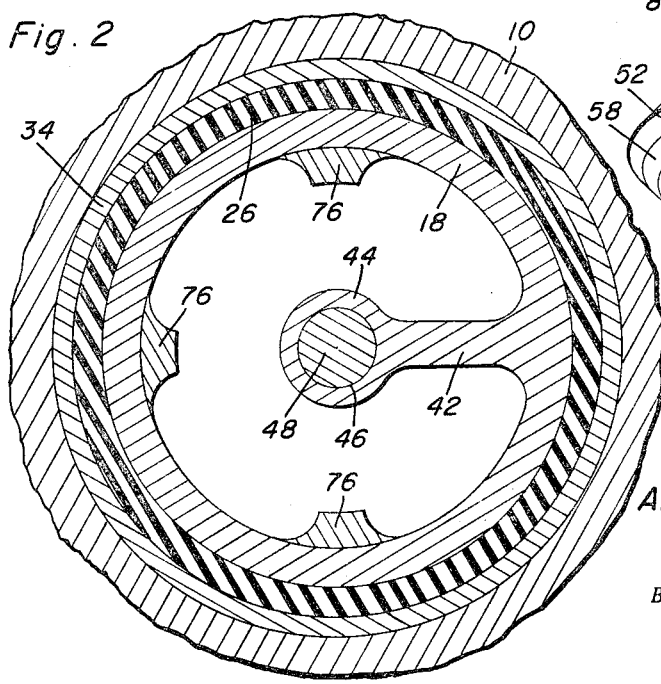
Figure 2 is a fragmentary horizontal sectional view taken substantially upon the plane indicated by the section line 2—2 of Figure 1 and shows further the details of construction of the valve seat.
Figure 3:
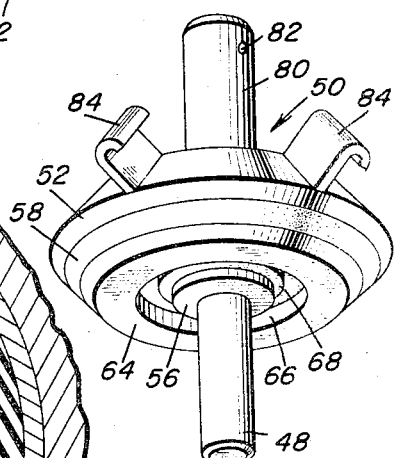
Figure 3 is a bottom perspective view of the valve member.

Referring now to the drawings in detail, it will be seen that there is illustrated a pump body member 10. Mounted in the pump body member 10 is a valve assembly which is the subject of this invention, the valve assembly being referred to in general by the reference numeral 12.

The pump body member 10 is provided with a bore or port 14, which as is best illustrated in Figure 1, is tapered. Seated in the bore 14 and projecting down slightly below the pump body member 10 is an annular valve seat which is referred to in general by the reference numeral 16. The valve 16 includes an annular valve seat body 18 which has a tapered peripheral surface 20 which wedgingly engages the surface of the bore 14 to retain the valve seat member 18 in the bore 14.

The valve seat member 18 is provided at the upper end thereof with an outwardly and upwardly open recess 22. Disposed in the recess 22 is an annular resilient valve seat insert 24. The valve seat insert 24 includes a vertical portion 26 which engages the valve seat body 18. The valve seat insert 24 also includes an inwardly offset upper portion 28 which projects above an upper valve seat surface 30 of the valve seat body 18. The upper outer part of the valve seat insert 24 is in the form of an annular projection 32.

It is to be noted that the peripheral portion of the valve seat body 18 terminates below the upper edge of the pump body member 10. Surounding the valve seat insert 24 and partially overlying the valve seat insert 24 is an annular pressure ring 34. The pressure ring 34 is provided with an inner recess 36 for receiving the valve seat insert 24 including the annular projection 32. The pressure ring 34 is provided with a tapered peripheral surface 38 which corresponds to the taper of the bore 14 so that when the pressure ring 34 is moved downwardly, it is urged inwardly into clamping engagement with the valve seat insert 24 so as to urge the portion 28 out above the valve seat surface 30. The pressure ring 34 includes a seating surface 40 at the upper inner part thereof. Normally the seating surface 40 projects out of the plane which is passed through the valve seat surface 30 although it is parallel thereto.

The valve seat body 18 also includes a rib 42 which extends inwardly and which terminates in a central boss 44. The boss 44 has a bore 46 in which there is seated a lower valve stem portion 48 of a valve member 50. Thus the boss 44 forms a guide for the valve member 50.

The valve member 50 includes a valve member body 52 which is generally circular in outline and which includes a downwardly directed peripheral portion 54. It is to be noted that the valve stem is enlarged as at 56 directly beneath the valve member body 52. Mounted on the enlarged portion 56 of the valve stem is a circular or annular resilient valve member insert 58. The valve member insert 58 is of a size so that a peripheral surface 60 thereof projects downwardly beyond a peripheral surface 62 of the valve body member 52.

Also carried by the enlarged portion 56 of the valve stem is a pressure plate 64. The pressure plate 64 is provided in the underside thereof with a circular recess 66 in which there is positioned a locking ring 68. The locking ring 68 fits in an annular groove 70 in the lower part of the enlarged portion 56 of the valve stem. The locking ring 70 serves to retain the pressure plate 64 on the valve stem portion 56 and to retain the pressure plate 64 in slight compressive engagement with the valve member insert 58. The pressure plate 64 includes a peripheral seating surface 72 which opposes the seating surface 30 of the valve seat member 18. It is also pointed out that the peripheral surfaces of the inserts 24 and 58 oppose each other and that the peripheral seating surface 62 of the valve body member 52 opposes the seating surface 40 of the pressure ring 34.

Projecting inwardly from the valve body member 18 is a plurality of ribs 76. Also, the rib 42 includes an upper projection 78 whose upper edge terminates coplanar with the upper edges of the ribs 76. The upper surfaces of the ribs 76 and the projection 78 form a stop for the pressure plate 64 and engage the underside thereof as the valve member 50 moves to a valve seat engaging position.

The valve member 50 also includes an upwardly projecting valve stem portion 80 having a bore 82 therein for receiving a nail or tool to facilitate the removal of the valve member 50. Also extending upwardly from the upper surface of the downwardly sloping outer portion 54 is a plurality of circumferentially spaced fins 84 which are so shaped and positioned whereby the flow of fluid through the valve assembly 12 will engage the fins 84 and cause rotation of the valve member 50.

In the operation of the valve assembly 12, as the valve member 50 moves downwardly, the valve member insert 58 will engage the valve seat insert 24 and the opposed seating surfaces thereof will form an initial seal. As the valve member 50 continues to move downwardly the pressure plate 64 will engage the ribs 76 and the projections 78. This will limit downward movement of the pressure plate 64. Further downward movement of the valve member body 52 and the valve member insert 58 will effect a further clamping of the valve member insert 58 and the expansion of the peripheral part thereof beyond the valve member body 52 to increase the seal between the valve member insert 58 in the valve seat insert 24. Also, the relationship of the valve seat body 18 and the pressure plate 64 is such that a seal will be formed between the opposed seating surfaces 30 and 72.

As the valve member body 52 moves downwardly, as described above, at the same time as the pressure plate 64 engages the ribs 76 in the projection 78, the opposed seating surfaces 32 and 62 will come into contact. Further downward movement of the valve member body 52 will result in the downward movement of the pressure ring 34. Downward movement of the pressure ring 34 will cause a further clamping of the valve seat insert 24 and the urging of the valve seat insert 24 upwardly between the pressure ring 34 and the valve seat body 18 to further increase the sealing contact between the valve seat insert 24 and the valve member insert 58.

From the foregoing description of the operation of the valve assembly 12, it will be seen that there has been devised a valve assembly which is of such a nature whereby the increased pressure and hammering action of a valve member on its valve seat will result in an increased seal. Further, the hammering action of the valve member against the valve seat, as occurs in pump valves and the like which are continuously operated, will not result in the damaging of the effective seating surfaces.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A valve assembly for pumps and the like comprising a valve seat and a valve member movably seated thereon, said valve seat and valve member having inclined mating surfaces, inserts disposed in said valve seat and said valve member, said valve seat including an annular valve seat body, said valve seat insert being annular and encircling said valve seat body and having an inclined surface in alignment with the inclined surface of said valve seat body, and a pressure ring clamping said valve seat insert in place and having an inclined surface in alignment with said valve seat body surface and said valve seat insert surface whereby a valve seat surface is defined, said valve member including a valve member stem concentric with said valve seat body, a valve member body having an inclined sealing surface contacting said pressure ring inclined surface so that upon movement of said valve member toward said valve seat said pressure ring is urged toward said valve seat insert and forcing a peripheral portion of said valve seat insert outwardly beyond said valve seat surface, said valve member insert having an inclined sealing surface opposing said valve seat insert and aligned with said valve member sealing surface, a pressure plate clamping said valve member insert in place and having an inclined sealing surface aligned with said valve member body surface and said valve member insert surface whereby a valve member sealing surface is defined, said pressure plate surface opposing said valve seat body surface so that upon movement of said valve member toward said valve seat said pressure plate is urged toward said valve member insert and forcing a peripheral portion of said valve member insert outwardly beyond said valve member surface.

2. A valve assembly for a port in a pump casing and the like comprising a valve seat in said port and a valve cooperating with said seat, said valve having a pair of seating surfaces and a resilient valve insert, said seat having a pair of seating surfaces and a resilient valve seat insert, the seating surfaces of said valve and the resilient valve insert being complementary to and respectively engageable with the seating surfaces of said seat and the resilient seat insert, one of said valve seating surfaces being a surface of a movable means on said valve for compressing said resilient valve insert into a tighter engagement with said resilient seat insert and one of said seating surfaces being a surface of a movable means on said seat for compressing said resilient valve seat insert into a tighter engagement with said resilient valve insert upon the final movement of said valve into cooperating engagement with said seat.

3. The combination of claim 2 including a laterally projecting valve member body fixedly secured to said valve and having one of said valve seating surfaces thereon, said first mentioned movable means comprising a laterally projecting pressure plate secured to said valve, said resilient valve insert being disposed between said pressure plate and said valve member body, whereby the seating of said pressure plate seating surface with one of said seat seating surfaces will move said plate towards said valve member body compressing said valve insert and forcing the latter into a tighter engagement with the valve seat insert thereby effecting a greater seal between the two inserts.

4. The combination of claim 2 wherein said valve seat includes a valve seat body fixedly secured within the inner portion of said port, said second mentioned movable means comprising a pressure ring slidingly received in the outer portion of said port, said valve seat insert being disposed between said valve seat body and said pressure ring, whereby the seating of the latter with one of said valve seating surfaces will move said pressure ring towards said valve seat body compressing said seat insert and forcing the latter into a tighter engagement with the valve insert thereby effecting a greater seal between the two inserts.

5. The combination of claim 2 including circumferentially spaced fins on the surface of said valve remote from the seating surfaces thereof, for effecting the rotation of said valve upon the passage of fluid through said bore.

References Cited in the file of this patent

UNITED STATES PATENTS

| | | |
|---|---|---|
| 75,670 | Douglas | Mar. 17, 1868 |
| 391,079 | Rinker | Oct. 16, 1888 |
| 1,041,165 | Riley | Oct. 15, 1912 |
| 1,409,393 | Monsarrat | Mar. 14, 1922 |
| 1,650,077 | Lamb et al. | Nov. 22, 1927 |
| 1,863,252 | Pierce | June 14, 1932 |
| 2,060,748 | Roberts et al. | Nov. 10, 1936 |
| 2,372,629 | Nelson | Mar. 27, 1945 |
| 2,483,572 | Cater | Oct. 4, 1949 |

FOREIGN PATENTS

| 1,816 | Great Britain | Apr. 27, 1881 |